Jan. 16, 1923.
J. I. DUCHÂTEAU.
SPRING WHEEL HUB.
FILED APR. 11, 1921.
1,442,656.
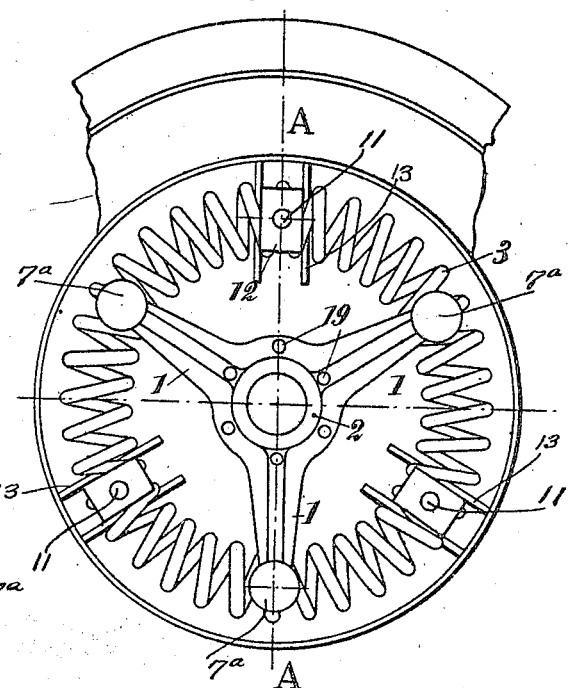
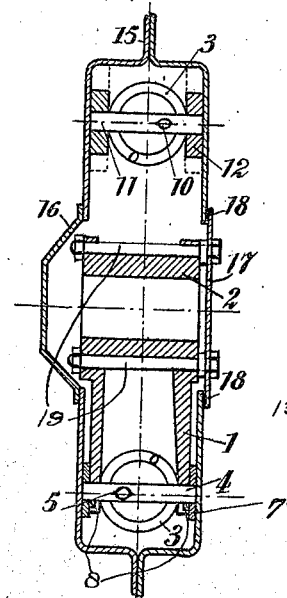
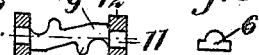
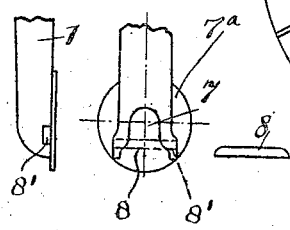
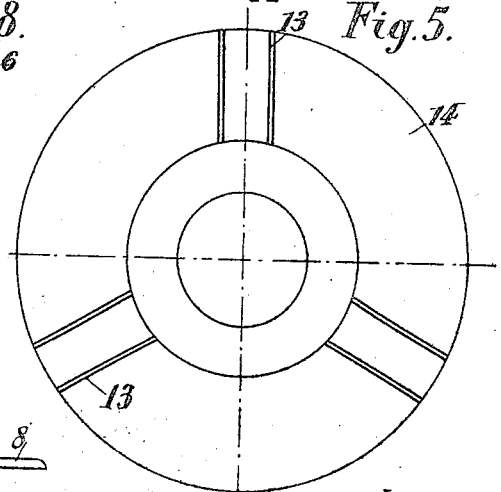
INVENTOR:
JEAN, ISIDORE DUCHÂTEAU.
ATTORNEY.

Patented Jan. 16, 1923.

1,442,656

UNITED STATES PATENT OFFICE.

JEAN ISIDORE DUCHÂTEAU, OF ST. OMER, FRANCE.

SPRING WHEEL HUB.

Application filed April 11, 1921. Serial No. 460,579.

*To all whom it may concern:*

Be it known that I, JEAN ISIDORE DUCHÂTEAU, a citizen of the French Republic, and resident of St. Omer, Pas de Calais, France, have invented certain new and useful Improvements in and Relating to Spring Wheel Hubs, of which the following is a specification.

This invention relates to improvements in spring wheel-hubs and has for its object to provide an improved spring wheel-hub, that is one which will be simple, resistant and light in construction and economical in operation.

In the accompanying drawings:

Fig. 1 is a front elevation of the hub showing a portion of the wheel to which it is applied.

Fig. 2 shows a section on line A—A of Fig. 1.

Fig. 3 is a front elevation of the end of one of the arms connected to the coil-spring, the connecting or locking key being shown detached.

Fig. 4 is an edge view of said arm.

Fig. 5 is a front elevation of the inner side face of the casing showing radial grooves.

Fig. 6 is a front elevation of a guiding crank-shaft with the blocks shown in section thereon.

Fig. 7 is a front elevation of an attaching crank-shaft.

Fig. 8 is an end-view of one end of said attaching crank-shaft.

The spring wheel-hub of my present invention comprises a small number of pairs of arms 1, at least three, extending radially from a hub member 2 and made integral with the same.

The free ends of each pair of arms support an elastic ring formed of a coil spring 3 of hollow or solid wire, by means of transverse rods 4 in the form of crank-shafts, which are inserted between the coils of the spring and then turned a quarter of a revolution around their longitudinal axes to cause the projections 5 to engage the adjacent coils. The opposite ends of each rod 4 have their centers positioned on the same axis, which is parallel to the center line of the wheel or wheel-axle. The ends 6 of said crank-shafts engage recesses 7 near the ends of the arms 1 and are held therein by means of keys 8. Plates 7ª are secured to the radial arms 1 at the ends thereof for closing one end of each recess 7, so that the crank shafts are held against endwise movement therein. The keys 8, when seated in the keyways 8', hold the crank shafts in the ends of the arms.

Other rods 9 also made of the form of crank shafts in accordance with the pitch of the coiled spring and provided with projections 10, are arranged transversely on the ring midway between the first named rods. Said crank shafts 9 have their ends made in the shape of journals 11, on which are mounted rectangular blocks 12 adapted to slide, in radial grooves 13 provided in the inner faces of the sides 14 of the casing.

The casing is detachable owing to the fact that one of its jaw or walls 15 is removable. It is closed towards the outer side by means of a tight cap 16, and on the opposite side by a disk 17, engaging the side of the casing by means of a friction joint 18. The disk 17 is secured to the hub member by means of screw-threaded pins 19 and nuts.

Having now fully described my said invention, what I claim and desire to secure by Letters Patent, is:

1. In a spring wheel hub, the combination with a central sleeve or hub member, of a plurality of radial arms extending from said central hub member, crank rods mounted in the free ends of said arms, a surrounding ring formed of a coil spring supported by the crank rods, said crank rods extending between the coils of said spring and the sinuosity of which corresponds to the pitch of the spring coils, the centers of the opposite ends of said crank shafts being on a common axis parallel to the axis of the wheel axle, projections arranged on each side of the cranks of said shafts to hold the latter in diametrical contact with the coils of the spring, and means engaging the spring intermediate the radial arms slidably mounted in plates carried by the wheel for resiliently supporting the same.

2. In a spring wheel hub, the combination with a central sleeve or hub member, of a plurality of radial arms extending from said central hub member, a surrounding ring shaped coil spring supported by the free ends of said arms, crank rods or shafts inserted between the coils of said spring and seated in the ends of the radial arms, the centers of the opposite ends of said rods being on a common axis parallel to the axis of the wheel axle, projections on either side of the cranks of said rods adapted to engage the convolutions of the spring for preventing relative movement thereof, shoulders at the opposite ends of the rods, locking keys adapted to be received by said shoulders, and means engaging the spring and carried by the wheel for supporting the wheel on the spring.

3. In a spring wheel hub, the combination with a central sleeve or hub member, of a plurality of radial arms extending from said central hub member, a surrounding ring-shaped coil spring supported by the free ends of said arms, crank rods or shafts inserted between the coils of said spring seated in the ends of the radial arms and having their axes parallel to the axis of the wheel-axle, projections on either side of the cranks of said rods to hold said cranks in diametrical contact with the coils of the spring, intermediate crank rods between said first-mentioned crank rods inserted between the coils of the spring, dies mounted on the ends of said crank-rods, a casing made integral with the wheel, and radial grooves carried by said casing and the walls of which slidably engaged by said dies, substantially as set forth.

4. In a spring wheel hub, the combination with a central sleeve or hub member, of a plurality of radial arms extending from said central hub member, a surrounding ring-shaped coil spring supported by the free ends of said radial arms, crank rods inserted between the coils of said spring seating in the ends of the radial arms and having their axes parallel to the axes of the wheel axle, projections on either side of the cranks of said rods for holding said cranks in diametrical contact with the coils of the spring, crank shafts inserted between the coils of said spring intermediate the radial arms, dies mounted on the ends of said crank shafts, and a casing carried by the wheel and formed with guideways, said dies projecting into the guideways and being slidable therein.

5. In a spring wheel hub, the combination with a central sleeve or hub member, of a plurality of radial arms extending from said central hub member, a surrounding ring-shaped coil spring supported by the free ends of said arms, crank rods inserted between the coils of said spring at equal intervals and at the ends of said arms, and supported therein, the axes of said rods being parallel to the axis of the wheel axle projections on either side of the cranks of said rods for holding the rods in diametrical relation with the coils of the spring, crank shafts inserted between the coils of said spring intermediate the radial arms, dies mounted on the ends of said crank shafts, and a casing mounted on the wheel and formed with radial grooves adapted to receive said dies for sliding movement therein.

6. A spring wheel hub comprising a hub member, a plurality of radial arms extending therefrom, an annular coil spring, supporting members engaging the convolutions of the coil spring and secured to the ends of the radial arms for supporting said spring thereon, other supporting members engaging the spring convolutions intermediate the first mentioned supporting members, and a casing carried by the wheel formed with guideways adapted to slidably receive the second mentioned supporting members, whereby the coil spring will absorb shocks delivered to it from the wheel.

In testimony whereof I have hereunto set my hand in presence of two witnesses.

JEAN ISIDORE DUCHÂTEAU.

Witnesses:
 JOHN J. VIZCARRA,
 THOS. MICHELSEN.